United States Patent Office 2,800,476
Patented July 23, 1957

2,800,476
ESTER-LIKE 6-ALKOXY-TROPINE DERIVATIVES

Arthur Stoll, Arlesheim, Basel, Ernst Jucker, Binningen, Basel, and Adolf Lindenmann, Basel, Switzerland, assignors, by mesne assignments, to Saul & Co., Newark, N. J., as nominee of Fidelity Union Trust Company No Drawing. Application January 17, 1955,
Serial No. 482,434

Claims priority, application Switzerland
January 22, 1954

6 Claims. (Cl. 260—292)

The present invention relates to new ester-like derivatives of tropine.

The said new derivatives of the present invention correspond to the formula

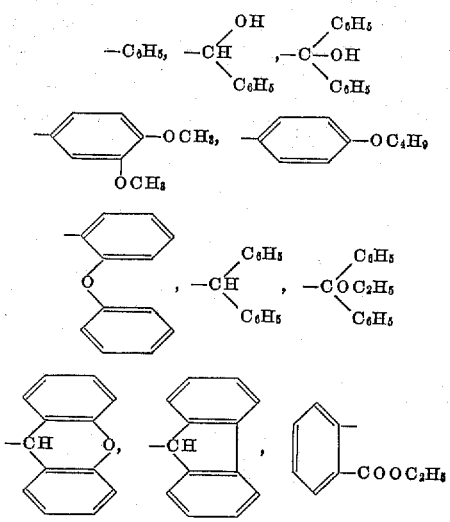

wherein $R_1$ is —$CH_3$, —$C_2H_5$ or —$C_3H_7$, $R_2$ represents a lower alkyl group with 1 to 4 carbon atoms, a lower alkenyl group, a lower hydroxyalkyl group or the benzyl group, and $R_3$ stands for one of the following radicals:

The aforesaid new derivatives of Formula I can be prepared, according to this invention, by reducing to the secondary alcohol group the keto group in the corresponding tropinone derivatives of the formula

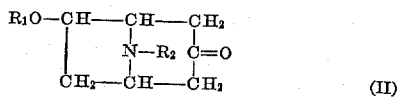

wherein $R_1$ and $R_2$ have the precedingly-recited significances, and then esterifying the so-obtained tropan-3-ol derivatives with acids corresponding to the formula $R_3$.COOH wherein $R_3$ has the aforesaid significance.

The tropinone derivatives (II) can be prepared after the manner described in Helv. Chim. Acta 37, 495 and 649 (1954), or after the manner disclosed in copending application Ser. No. 438, 334, filed June 21, 1954, and in the corresponding acknowledged Swiss patent applications. Briefly stated, this is effected by condensing an O-alkyl-malic dialdehyde with acetone dicarboxylic acid and an aliphatic or alkylaromatic primary amine, after the manner of the following reaction scheme ($R_1$ and $R_2$ having the aforesaid significances):

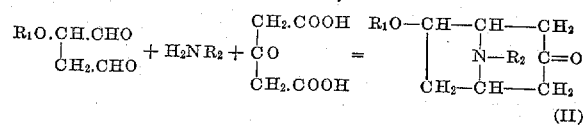

The reduction of the keto group of compound (II) to the secondary alcohol group may be effected in various ways, for example by catalytic hydrogenation with or without superatmospheric pressure at normal or raised temperature, or by means of sodium in an alcohol, or by treatment with lithium-aluminium-hydride. Catalytic hydrogenation leads to tropine derivatives; reduction with sodium and alcohol leads to pseudotropine derivatives.

The acylation can be realized for example by alcoholysis, the tropine derivative being heated with an ester of the formula $R_3$.COO-alkyl in the presence of sodium metal, and being thus converted into the corresponding tropine ester. The desired esters can also be obtained by reacting the tropine derivative with an acid chloride of the formula $R_3$.CO.Cl. ($R_3$ in both last mentioned formulae has the previously indicated significance.)

The 6-alkoxy-tropine derivatives of the present invention are useful pharmaceuticals and because of their strong pharmacodynamic action can be used as medicaments having scopolamine-atropine action. Thus, they are useful as antispasmodics. They are superior to atropine with regard to their spasmolytic action. On the other hand, they do not suppress salivation and do not cause mydriasis to such an extent as atropine. They also comprise strong local anesthetics, e. g. the esters of benzoic and benzilic acid.

Finally, they are useful as intermediates for the preparation of other medicaments. For example, they can be converted into the corresponding quaternary ammonium compounds, which are useful as curare-substitutes, by the action of alkyl halides; thus e. g. 6-methoxy-tropine-xanthene-9-carboxylic acid ester forms a useful bromomethylate in this way.

The following examples set forth, solely by way of illustration, presently-preferred representative embodiments of the invention. Parts are by weight unless otherwise indicated; the relationship between parts by weight and parts by volume is the same as that between grams and milliliters. Temperatures are indicated in degrees centigrade. Percentages are also by weight.

Example 1

5 parts of 6-methoxy-tropinone hydrochloride in 50 parts by volume of absolute methanol are hydrogenated in an autoclave in the presence of Raney nickel for five hours at 40–45° and at an initial pressure of 60 atmospheres. The catalyst is then filtered off, and the greater part of the solvent is evaporated off under reduced pressure, whereupon the formed 6-methoxy-tropine hydrochloride ($C_9H_{18}NCl$) crystallizes out. After recrystallization from methanol-ether, it has a melting point of 205–206°.

The hydrogenation may alternatively be carried out with the free base rather than with the hydrochloride.

A mixture of 3 parts of 6-methoxy-tropine and 8.4 parts of xanthene-9-carboxylic acid-methylester is heated to 130° with about 0.1 part of sodium metal for 30 hours under reduced pressure (about 1 mm. Hg). After cooling, reaction mixture is taken up in 60 parts by volume of 2-normal hydrochloric acid, and is then extracted with a total of 160 parts by volume of ether. The aqueous hydrochloric acid layer is shaken out with a total of 300 parts by volume of chloroform, the chloroform extract is dried over sodium sulfate and is then evaporated under reduced pressure. The desired product—6-methoxy-tropine-xanthene-9-carboxylic acid ester—is obtained directly from the hydrochloride residue, which can not be crystallized.

*Example 2*

6.5 parts of sodium are added portionwise in the course of two hours and while stirring, to a boiling solution of 6.5 parts of 6-methoxy-tropinone in 65 parts by volume of absolute ethanol. The reaction mixture is distilled with steam, the residue extracted with a total of 200 parts by volume of ether, the extract dried over sodium sulfate, the ether evaporated off, and the residue fractionated under a high vacuum. 6-methoxy-pseudo-tropine boils at 102–107° under a pressure of 0.6 mm. Hg.

A mixture of 1.5 parts of 6-methoxy-pseudo-tropine and 4.47 parts of benzilic acid-ethylester is heated to 110° for 30 hours under reduced pressure (about 1 mm. Hg) with about 0.1 part of sodium metal. After cooling, the reaction mixture is taken up in 30 parts by volume of 2-normal hydrochloric acid, and is then extracted with a total of 150 parts by volume of ether. The aqueous hydrochloric acid layer is shaken out with a total of 250 parts by volume of chloroform, and the chloroform extract is then dried over sodium sulfate and is evaporated under reduced pressure. The residue from the evaporation is dissolved in a small quantity of methanol, the solution filtered through animal charcoal, and the formed 6-methoxy-pseudo-tropine-benzilic acid ester hydrochloride is caused to crystallize out by the addition of ether. Recrystallized from methanol-ether, the hydrochloride is obtained in the form of crystals which melt at 237–239° (with decomposition).

The 6-methoxy-pseudo-tropine-benzilic acid ester, obtained from the hydrochloride, melts at 121–123°, after recrystallization from acetone-petroleum ether.

*Example 3*

A mixture of 1.28 parts of 6-methoxy-pseudo-tropine and 3.9 parts of α-phenyl-α-cyclohexyl-glycolic acid-ethylester is heated with about 0.1 part of sodium to 110° under a pressure of about 1 mm. Hg for 30 hours. The reaction mixture is cooled and is then taken up in 50 parts by volume of 2-normal hydrochloric acid, after which it is extracted with a total of 100 parts by volume of ether. The aqueous hydrochloric acid layer is shaken out with a total of 300 parts by volume of chloroform, and the chloroform extract is then dried over sodium sulfate and evaporated under reduced pressure. The residue from the evaporation is dissolved in a small quantity of acetone, the solution filtered through animal charcoal, and the formed 6-methoxy-pseudo-tropine-α-phenyl-α-cyclohexyl-glycolic acid ester hydrochloride is caused to crystallize out by the addition of ether. Recrystallized from acetone-ether, the hydrochloride is obtained in the form of crystals which melt at 243–245° (with decomposition).

*Example 4*

A mixture of 3 parts of 6-methoxy-pseudo-tropine and 9.12 parts of phenyl-cyclohexyl-acetic acid-ethylester is heated with about 0.1 part of sodium metal to 130° under reduced pressure (about 1 mm. Hg) for 30 hours. The reaction mixture is cooled and is then taken up in 50 parts by volume of 2-normal hydrochloric acid, after which it is extracted with a total of 150 parts by volume of ether. The aqueous hydrochloric acid layer is shaken out with a total of 300 parts by volume of chloroform, and the chloroform extract is then dried over sodium sulfate and evaporated under reduced pressure. The residue from the evaporation is dissolved in a small quantity of acetone, the solution filtered through animal charcoal, and the formed 6-methoxy-pseudo-tropine-phenyl-cyclohexyl-acetic acid ester hydrochloride is caused to crystallize out by the addition of ether. Recrystallized from acetone-ether, the hydrochloride is obtained in the form of crystals which melt at 206–209° (with decomposition).

*Example 5*

A mixture of 2 parts of 6-methoxy-pseudo-tropine and 5.2 parts of p-butoxy-benzoic acid-ethylester is heated with about 0.1 part of sodium metal to 130° under reduced pressure (about 1 mm. Hg) for 30 hours. The reaction mixture is cooled and is taken up in 50 parts by volume of 2-normal hydrochloric acid, after which it is extracted with a total of 150 parts by volume of ether. The aqueous hydrochloric acid layer is shaken out with a total of 300 parts by volume of chloroform, and the chloroform extract is then dried over sodium sulfate and evaporated under reduced pressure. The residue from the evaporation is dissolved in a small quantity of acetone, the solution filtered through animal charcoal, and the formed 6-methoxy-pseudo-tropine-p-butoxy-benzoic acid ester hydrochloride is caused to crystallize out by the addition of ether. Recrystallized from acetone-ether, the hydrochloride is obtained in the form of crystals which melt at 197–199° (with decomposition).

*Example 6*

A mixture of 3 parts of 6-methoxy-pseudo-tropine and 8.5 parts of o-phenoxy-benzoic acid-ethylester is heated with about 0.1 part of sodium metal to 130° under reduced pressure (about 1 mm. Hg) for 30 hours. The reaction mixture is cooled and is then taken up in 50 parts by volume of 2-normal hydrochloric acid, after which it is extracted with a total of 150 parts by volume of ether. The aqueous hydrochloric acid layer is shaken out with a total of 300 parts by volume of chloroform, and the chloroform extract is then dried over sodium sulfate and evaporated under reduced pressure. The residue from the evaporation is dissolved in a small quantity of ethanol, the solution filtered through animal charcoal, and the formed 6-methoxy-pseudo-tropine-o-phenoxy-benzoic acid ester hydrochloride is caused to crystallize out by the addition of ether. Recrystallized from ethanol-ether, the hydrochloride is obtained in the form of crystals which melt at 228–229° (with decomposition).

*Example 7*

A mixture of 3 parts of 6-methoxy-pseudo-tropine and 8.3 parts of fluorene-9-carboxylic acid-ethylester is heated with about 0.1 part of sodium metal to 130° under reduced pressure (about 1 mm. Hg) for 30 hours. The reaction mixture is cooled and is then taken up in 50 parts by volume of 2-normal hydrochloric acid, after which it is extracted with a total of 150 parts by volume of ether. The aqueous hydrochloric acid layer is shaken out with a total of 300 parts by volume of chloroform, and the chloroform extract is then dried over sodium sulfate and evaporated under reduced pressure. The residue from the evaporation is dissolved in a small quantity of acetone, the solution filtered through animal charcoal, and the formed 6-methoxy-pseudo-tropine-fluorene-9-carboxylic acid ester hydrochloride is caused to crystallize out by the addition of ether. Recrystallized from acetone-ether, the hydrochloride is obtained in the form of crystals which melt at 215–217° (with decomposition).

*Example 8*

A mixture of 3 parts of 6-methoxy-pseudo-tropine and 8.4 parts of xanthene-9-carboxylic acid-methylester is heated with about 0.1 part of sodium metal to 130° under reduced pressure (about 1 mm. Hg) for 30 hours. The reaction mixture is cooled and is then taken up in 60 parts by volume of 2-normal hydrochloric acid, after which it is extracted with a total of 160 parts by volume of ether. The aqueous hydrochloric acid layer is shaken out with a total of 300 parts by volume of chloroform, and the chloroform extract is then dried over sodium sulfate and evaporated under reduced pressure. The residue from the evaporation is dissolved in a small quantity of methanol, the solution filtered through animal charcoal, and the formed 6-methoxy-pseudo-tropine-xanthene-9-carboxylic acid ester hydrochloride is caused to crystallize out by the addition of ether. Recrystallized from methanol-ether, the hydrochloride is obtained in the form of crystals which melt at 208–211° (with decomposition).

Example 9

5 parts by weight of 6-ethoxy-tropinone hydrochloride in 50 parts by volume of absolute ethanol are hydrogenated in an autoclave in the presence of Raney nickel for 5 hours at 40–45° and 60 atmospheres pressure. The catalyst is removed by filtration and the alcohol is distilled off under slightly reduced pressure. The oily residue is taken up in 10 parts by volume of water, adjusted to alkalinity with saturated aqueous sodium carbonate solution, saturated with sodium chloride, and the formed 6-ethoxy-tropine is extracted with a total of 60 parts by volume of chloroform. After drying over sodium sulfate and distilling off the chloroform, the residue is distilled under a high vacuum. It boils at 106° at a pressure of 0.7 mm. of mercury.

A mixture of 3 parts of 6-ethoxy-tropine and 7.27 parts of p-butoxy-benzoic acid-ethylester is heated with about 0.1 part of sodium metal to 130° under reduced pressure (about 1 mm. Hg) for 30 hours. The reaction mixture is cooled and is then taken up in 50 parts by volume of 2-normal hydrochloric acid, after which it is extracted with a total of 150 parts by volume of ether. The aqueous hydrochloric acid layer is shaken out with a total of 300 parts by volume of chloroform, and the chloroform extract is then dried over sodium sulfate and evaporated under reduced pressure. The residue from the evaporation is dissolved in a small quantity of acetone, the solution filtered through animal charcoal, and the formed 6-ethoxy-tropine-p-butoxy-benzoic acid ester hydrochloride is caused to crystallize out by the addition of ether. Recrystallized from acetone-ether, the hydrochloride is obtained in the form of crystals which melt at 188–190° (with decomposition).

Example 10

A mixture of 4 parts of 6-ethoxy-tropine and 10.97 parts of o-phenoxy-benzoic acid-ethylester is heated with about 0.1 part of sodium metal to 130° under reduced pressure (about 1 mm. Hg) for 30 hours. The reaction mixture is cooled and is then taken up in 50 parts by volume of 2-normal hydrobromic acid, after which it is extracted with a total of 150 parts by volume of ether. The aqueous hydrobromic acid layer is shaken out with a total of 300 parts by volume of chloroform, and the chloroform extract is then dried over sodium sulfate and evaporated under reduced pressure. The residue from the evaporation is dissolved in a small quantity of ethanol, the solution filtered through animal charcoal, and the formed 6-ethoxytropine-o-phenoxy-benzoic acid ester hydrobromide is caused to crystallize out by the addition of ether. Recrystallized from ethanol-ether, the hydrobromide is obtained in the form of crystals which melt at 174–175° (with decomposition).

Example 11

A mixture of 3 parts of 6-ethoxy-tropine and 7.7 parts of fluorene-9-carboxylic acid-ethylester is heated with about 0.1 part of sodium metal to 110° under reduced pressure (about 1 mm. Hg) for 30 hours. The reaction mixture is cooled and is then taken up in 50 parts by volume of 2-normal hydrochloric acid, after which it is extracted with a total of 150 parts by volume of ether. The aqueous hydrochloric acid layer is shaken out with a total of 300 parts by volume of chloroform, and the chloroform extract is then dried over sodium sulfate and evaporated under reduced pressure. The residue from the evaporation is dissolved in a small quantity of acetone, the solution filtered through animal charcoal, and the formed 6-ethoxy-tropine-fluorene-9-carboxylic acid ester hydrochloride is caused to crystallize out by the addition of ether. Recrystallized from acetone-ether, the hydrochloride is obtained in the form of crystals which melt at 169–172° (with decomposition).

Example 12

A mixture of 3 parts of 6-ethoxy-tropine and 7.3 parts of xanthene-9-carboxylic acid-methylester is heated with about 0.1 part of sodium metal to 130° under reduced pressure (about 1 mm. Hg) for 30 hours. The reaction mixture is cooled and is then taken up in 60 parts by volume of 2-normal hydrochloric acid, after which it is extracted with a total of 160 parts by volume of ether. The aqueous hydrochloric acid layer is shaken out with a total of 300 parts by volume of chloroform, and the chloroform extract is then dried over sodium sulfate and evaporated under reduced pressure. The residue from the evaporation is dissolved in a small quantity of ethanol, the solution filtered through animal charcoal, and the formed 6-ethoxy-tropine-xanthene-9-carboxylic acid ester hydrochloride is caused to crystallize out by the addition of ether. Recrystallized from ethanol-ether, the hydrochloride is obtained in the form of crystals which melt at 235–237° (with decomposition).

Example 13

130 parts of sodium are added portionwise in the course of 2 hours and while stirring to a boiling solution of 130.7 parts of 6-ethoxy-torpinone in 1400 parts by volume of absolute ethanol. The reaction mixture is distilled with steam, the distillation residue is saturated with sodium chloride and is extracted with a total of 600 parts by volume of chloroform. The chloroform extract is dried over sodium sulfate and is then evaporated under reduced pressure; the residue is distilled in a high vacuum, 6-ethoxy-pseudo-tropine distilling over at 123–131° under a pressure of 0.8 mm. Hg and solidifying in the condenser. After recrystallization from acetone-petroleum ether, the product melts at 76–78°.

A mixture of 3 parts of 6-ethoxy-pseudo-tropine and 8.5 parts of phenyl-cyclohexyl-acetic acid-ethylester is heated with about 0.1 part of sodium metal to 130° under reduced pressure (about 1 mm. Hg) for 30 hours. The reaction mixture is cooled and is then taken up in 50 parts by volume of 2-normal hydrochloric acid, after which it is extracted with a total of 150 parts by volume of ether. The aqueous hydrochloric acid layer is shaken out with a total of 300 parts by volume of chloroform, and the chloroform extract is then dried over sodium sulfate and evaporated under reduced pressure. The residue from the evaporation is dissolved in a small quantity of acetone, the solution filtered through animal charcoal, and the formed 6-ethoxy-pseudo-tropine-phenyl-cyclohexyl-acetic acid ester hydrochloride is caused to crystallize out by the addition of ether. Recrystallized from acetone-ether, the hydrochloride is obtained in the form of crystals which melt at 194–196° (with decomposition).

Example 14

A mixture of 2 parts of 6-ethoxy-pseudo-tropine and 6.14 parts of ethoxy-diphenyl-acetic acid-ethylester is heated with about 0.1 part of sodium metal to 110° under reduced pressure (about 1 mm. Hg) for 30 hours. The reaction mixture is cooled and is then taken up in 50 parts by volume of 2-normal hydrochloric acid, after which it is extracted with a total of 160 parts by volume of ether. The aqueous hydrochloric acid layer is shaken out with a total of 350 parts by volume of chloroform, and the chloroform extract is then dried over sodium sulfate and evaporated under reduced pressure. The residue from the evaporation is dissolved in a small quantity of acetone, the solution filtered through animal charcoal, and the formed 6-ethoxy-pseudo-tropine-ethoxy-diphenyl-acetic acid ester hydrochloride is caused to crystallize out by the addition of ether. Recrystallized from acetonether, the hydrochloride is obtained in the form of crystals which melt at 164–166° (with decomposition).

Example 15

A mixture of 3 parts of 6-ethoxy-pseudo-tropine and 4.5 parts of α-phenyl-α-cyclohexyl-glycolic acid-ethylester is heated with about 0.1 part of sodium metal to 130° under reduced pressure (about 1 mm. Hg) for 30 hours. The reaction mixture is cooled and is then taken up in 50 parts by volume of 2-normal hydrochloric acid, after which it is extracted with a total of 150 parts by volume of ether. 100 parts by volume of chloroform are added to the aqueous hydrochloric layer, which is then adjusted to weak alkalinity (weakly alkaline to phenolphthalein) by means of saturated aqueous sodium carbonate solution while cooling with ice, after which it is extracted with a total of 300 parts by volume of chloroform. The combined chloroform extracts are dried over sodium sulfate and are then evaporated under reduced pressure, whereupon they leave as residue the 6-ethoxy-pseudo-tropine-α-phenyl-α-cyclohexyl glycolic acid ester.

Example 16

A mixture of 3 parts of 6-ethoxy-pseudo-tropine and 7.2 parts of p-butoxy-benzoic acid-methylester is heated with about 0.1 part of sodium metal to 130° under reduced pressure (about 1 mm. Hg) for 30 hours. The reaction mixture is cooled and is then taken up in 50 parts by volume of 2-normal hydrochloric acid, after which it is extracted with a total of 150 parts by volume of ether. The aqueous hydrochloric acid layer is shaken out with a total of 300 parts by volume of chlorofrom, and the chloroform extract is then dried over sodium sulfate and evaporated under reduced pressure. The residue from the evaporation is dissolved in a small quantity of ethanol, the solution filtered through animal charcoal, and the formed 6-ethoxy-pseudo-tropine-p-butoxy-benzoic acid ester-hydrochloride is caused to crystallize out by the addition of ether. Recrystallized from ethanol-ether, the hydrochloride is obtained in the form of crystals which melt at 178–180° (with decomposition).

Example 17

3 parts of 6-ethoxy-pseudo-tropine and 7.72 parts of fluorene-9-carboxylic acid-ethylester are heated with about 0.1 part of sodium metal to 110–115° under reduced pressure (about 1 mm. Hg) for 30 hours. The reaction mixture is cooled and is then taken up in 50 parts by volume of 2-normal hydrochloric acid, after which it is extracted with a total of 150 parts by volume of ether. The aqueous hydrochloric acid layer is shaken out with a total of 300 parts by volume of chloroform, and the chloroform extract is then dried over sodium sulfate and evaporated under reduced pressure. The residue from the evaporation is dissolved in a small quantity of acetone, the solution filtered through animal charcoal, and the formed 6-ethoxy-pseudo-tropine-fluorene-9-carboxylic acid ester hydrochloride is caused to crystallize out by the addition of ether. Recrystallized from acetone-ether, the hydrochloride is obtained in the form of crystals which melt at 236–238° (with decomposition).

Example 18

A mixture of 3 parts of 6-ethoxy-pseudo-tropine and 7.7 parts of xanthene-9-carboxylic acid-methylester is heated with about 0.1 part of sodium metal to 130° under reduced pressure (about 1 mm. Hg) for 30 hours. The reaction mixture is cooled and is then taken up in 60 parts by volume of 2-normal hydrochloric acid, after which it is extracted with a total of 160 parts by volume of ether. The aqueous hydrochloric acid layer is shaken out with a total of 300 parts by volume of chloroform, and the chloroform extract is then dried over sodium sulfate and evaporated under reduced pressure. The residue from the evaporation is dissolved in a small quantity of ethanol, the solution filtered through animal charcoal, and the formed 6-ethoxy-pseudo-tropine-xanthene-9-carboxylic acid ester hydrochloride is caused to crystallize out by the addition of ether. Recrystallized from ethanol-ether, the hydrochloride is obtained in the form of crystals which melt at 237–239° (with decomposition).

Example 19

15 parts of N-hydroxyethyl-6-methoxy-nortropinone in 50 parts by volume of absolute methanol are hydrogenated in an autoclave in the presence of Raney nickel for 5 hours at 45° and at an initial pressure of 60 atmospheres. The catalyst is filtered off, and the methanol is evaporated under reduced pressure, after which the residue is distilled in a high vacuum. N-hydroxy-ethyl-6-methoxy-nortropine, which boils at 115–125° under a pressure of 0.08 mm. Hg, is collected.

A mixture of 4 parts of N-hydroxyethyl-6-methoxy-nortropine and 8.9 parts of benzoic acid-ethylester is heated with about 0.2 part of sodium metal to 125–130° under reduced pressure (about 1 mm. Hg) for 30 hours. The reaction mixture is cooled and is then taken up in 50 parts by volume of 2-normal hydrochloric acid, after which it is extracted with a total of 240 parts by volume of ether. The aqueous hydrochloric acid layer is shaken out with a total of 300 parts by volume of chloroform, and the chloroform extract is then dried over sodium sulfate and evaporated under reduced pressure. The residue from the evaporation is dissolved in a small quantity of methanol, the solution filtered through animal charcoal, and the formed N-hydroxyethyl-6-methoxy-nortropine-dibenzoic acid ester hydrochloride is caused to crystallize out by the addition of ether. Recrystallized from methanol-ether, the hydrochloride is obtained in the form of crystals which melt at 163–166° (with decomposition).

Example 20

(a) A solution of 3 parts of 6-methoxy-pseudotropine and 2.31 parts of diphenyl-chloroacetic acid chloride in 100 parts by volume of benzene is heated to 80–85° under reflux for 24 hours, after which the reaction solution is cooled and extracted with a total of 200 parts by volume of 2-normal hydrochloric acid. The aqueous hydrochloric acid layer is then shaken out with a total of 400 parts by volume of chloroform. The combined chloroform extracts are dried over sodium sulfate and then evaporated, whereupon there remains as residue the 6-methoxy-pseudo-tropine-benzilic acid ester hydrochloride which, for further purification, can be converted by way of the free ester into the readily crystallizing hydrobromide. After recrystallization from methanol-ether, the hydrobromide is obtained as crystals which melt at 226–228° (with decomposition).

(b) A mixture of 2.1 parts of 6-methoxy-pseudotropine and 2.7 parts of diphenyl-chloroacetic acid chloride is heated to 100° for 2 hours, the reaction mixture is then poured into ice water, 2-normal hydrochloric acid is added and the aqueous hydrochloric acid solution is shaken out with a total of 200 parts by volume of ether. The aqueous hydrochloric acid layer is then extracted with a total of 200 parts by volume of chloroform. The combined chloroform extracts are dried over sodium sulfate and then evaporated under reduced pressure, leaving as residue the 6-methoxy-pseudo-tropine hydrochloride from which the free base, which is identical with that obtained according to the first paragraph of Example 2, can be prepared. The 6-methoxy-pseudo-tropine can be further treated as described in Example 2 or as described in paragraph (a) of the present example.

Example 21

A mixture of 7.29 parts of 6-methoxy-tropine and 21.9 parts of benzilic acid-ethylester is heated with 0.2 part of sodium metal to 125–130° under reduced pressure (about 2 mm. Hg) for 30 hours. The initially strong bubble and foam formation caused by ethanol which distils off, completely ceases toward the end of the reaction period. After cooling, the reaction mixture is taken up in 80 parts by volume of 2-normal hydrochloric acid and is extracted with a total of 200 parts by volume of ether. The aqueous hydrochloric acid layer is made alkaline with aqueous ammonium hydroxide solution of 25% strength, the precipitated 6-methoxy-tropine-benzilic acid ester is extracted with a total of 300 parts by volume of chloroform, after which the combined chloroform extracts are dried over sodium sulfate and the chloroform distilled off. After standing for a short time, the residue crystallizes; melting point 98–100°. After recrystallization from benzene-petroleum ether and from benzene alone, the obtained 6-methoxy-tropine-benzilic acid ester, $C_{23}H_{27}O_4N$, melts at 99–101°. The corresponding 6-methoxy-tropine-benzilic acid ester hydrochloride melts at 146–148° after recrystallization from methanol-ether; the corresponding 6-methoxy-tropine-benzilic acid ester hydrobromide melts at 197–199° after recrystallization from methanol-ether.

*Example 22*

A mixture of 16.6 parts of 6-methoxy-tropine and 29.1 parts of benzoic acid-ethylester is heated with 0.3 part of sodium to 125–130° under reduced pressure (about 10 mm. Hg) for 30 hours. The initially strong foaming due to distilling ethanol ceases completely toward the end of the reaction period. After cooling, the reaction mixture is dissolved in 150 parts by volume of 2-normal hydrochloric acid and extracted with a total of 90 parts by volume of ether. The aqueous hydrochloric acid solution is then adjusted to alkalinity with aqueous ammonium hydroxide solution of 25% strength and is shaken out with a total of 400 parts by volume of chloroform. The combined chloroform extracts are dried over sodium sulfate, after which the chloroform is distilled off under slightly reduced pressure leaving behind the 6-methoxy-tropine-benzoic acid ester.

The corresponding 6-methoxy-tropine-benzoic acid ester hydrochloride, recrystallized from acetone melts at 216–218°; the 6-methoxy-tropine-benzoic acid ester hydrobromide, recrystallized from methanol-ether melts at 227–230°.

*Example 23*

A mixture of 5.5 parts of 6-methoxy-tropine and 13.5 parts of veratric acid-ethylester is heated with about 0.2 part of sodium metal to 125–130° under reduced pressure (3–10 mm. Hg) for 30 hours. The initially strong bubble and foam formation, due to distilling ethanol, ceases completely toward the end of the reaction period. After cooling, the reaction mixture is taken up in 40 parts by volume of 2-normal hydrochloric acid and is extracted with a total of 110 parts by volume of ether. The aqueous hydrochloric acid layer is rendered alkaline with aqueous ammonium hydroxide solution of 25% strength while cooling with ice, and the obtained 6-methoxy-tropine-veratric acid ester is extracted with a total of 150 parts by volume of chloroform. The combined chloroform extracts are dried over sodium sulfate and then the chloroform is evaporated off under reduced pressure. After standing for a short period of time, crystallization of the residue, 6-methoxy-tropine-veratric acid ester, $C_{18}H_{25}O_5N$, takes place. Recrystallized from benzene-petroleum ether, it melts at 96–98°.

The ester can be most advantageously purified by way of the 6-methoxy-tropine-veratric acid ester hydrobromide which, recrystallized from methanol-ether, melts at 209–211°. The corresponding 6-methoxy-tropine-veratric acid ester hydrochloride, recrystallized from methanol-ether, melts at 219–221°.

*Example 24*

A mixture of 3.4 parts of 6-methoxy-tropine, 7.2 parts of mandelic acid-ethylester and about 0.1 part of sodium metal is heated to 125–130° under reduced pressure (about 5 mm. Hg) for 30 hours. Upon completion of the reaction, the reaction mixture is taken up in 40 parts by volume of 2-normal hydrochloric acid and is then shaken out with a total of 100 parts by volume of ether. It is then further extracted with a total of 100 parts by volume of chloroform. 100 parts by volume of chloroform are then added to the acid aqueous solution, which is then adjusted to weak alkalinity (weakly alkaline to phenolphthalein) by means of saturated aqueous sodium carbonate solution while cooling with ice, and is extracted with a total of 400 parts by volume of chloroform. The combined chloroform extracts are dried over sodium sulfate and the chloroform is distilled off under reduced pressure. The residue is 6-methoxy-tropine-mandelic acid ester (6-methoxy-homatropine) which can be directly converted into its salts.

*Example 25*

A mixture of 4.3 parts of 6-ethoxy-tropine and 11.95 parts of benzilic acid-ethylester is heated with about 0.2 part of sodium metal to 125–130° under reduced pressure (about 1 mm. Hg) for 30 hours. Toward the end of the reaction period, no more bubble formation is evidenced. After cooling, the reaction mixture is taken up in 40 parts by volume of 2-normal hydrochloric acid and extracted with a total of 110 parts by volume of ether. 80 parts by volume of chloroform are then added to the aqueous hydrochloric acid solution, cooling is effected with ice, and adjustment to alkalinity with aqueous ammonium hydroxide solution of 25% strength. Extraction is then carried out with 400 parts by volume of chloroform and the combined chloroform extracts are dried over sodium sulfate. After distilling off the chloroform, an oily brown residue, remains. This is dissolved in a small quantity of ethanol and filtered through animal charcoal. Upon concentration, 6-ethoxy-tropine-benzilic acid ester separates out; its melting point is 132–134°, after recrystallization from ethanol. The 6-ethoxy-tropine-benzilic acid ester hydrochloride melts with decomposition at 100° after recrystallization from ethanol-ether; it melts at 186–187° upon recrystallization from acetone.

*Example 26*

A mixture of 4.26 parts of 6-ethoxy-tropine and 6.9 parts of benzoic acid-ethylester is heated with 0.1 part of sodium metal to 125–130° under reduced pressure (12 mm. Hg) for 30 hours. After cooling, the reaction mixture is taken up in 40 parts by volume of 2-normal hydrochloric acid and extracted with a total of 100 parts by volume of ether. 50 parts by volume of chloroform are then added to the aqueous acid solution, the whole is cooled with ice and rendered weakly alkaline (to phenolphthalein) with saturated aqueous sodium carbonate solution. Extraction is carried out with a total of 270 parts by volume of chloroform, the combined chloroform extracts are dried over sodium sulfate, and the extracting agent is distilled off under slightly reduced pressure. The oily residue is taken up in 30 parts by volume of ethanol and is purified with the aid of animal charcoal and aluminum oxide, to yield the desired 6-ethoxy-tropine-benzoic acid ester.

The corresponding 6-ethoxy-tropine-benzoic acid ester hydrobromide, recrystallized from ethanol-ether, melts at 192–194°.

*Example 27*

10 parts of N-butyl-6-methoxy-nortropinone hydrochloride in 100 parts by volume of absolute methanol are hydrogenated in the presence of Raney nickel in an autoclave for 5 hours at 40–45° and an initial pressure of 60 atmospheres. The catalyst is filtered off, and the solvent is evaporated under reduced pressure. The residue, N-butyl-6-methoxy-nortropine-hydrochloride, crystallizes completely upon standing at room temperature (about 20–30°). Upon recrystallization from methanol-ether, two forms are obtained which melt at 137–139° and 156–157°, respectively.

The corresponding N-butyl-6-methoxy-nortropine hydrobromide, recrystallized from acetone, melts at 120–122°.

The free base is obtained by adding potash (potassium carbonate) to the aqueous solution of the hydrochloride and extracting with chloroform. N-butyl-6-methoxy-nortropine passes over as a colorless oil at 104–106° at a pressure of 0.4 mm. Hg.

A mixture of 4.6 parts of N-butyl-6-methoxy-nortropine and 11 parts of benzilic acid-ethylester is heated with about 0.2 part of sodium metal at 125–130° under reduced pressure (5–10 mm. Hg) for 30 hours. The reaction mixture is thereupon taken up in 40 parts by volume of 2-normal hydrochloric acid and is extracted with a total of 110 parts by volume of ether. 50 parts by volume of chloroform are then added to the aqueous hydrochloric acid solution, cooling is effected with ice, ammonium hydroxide solution of 25% strength added until alkalinity to phenolphthalein is achieved, and extraction is effected with a total of 300 parts by volume of chloroform. The combined chloroform extracts are dried over sodium sulfate, and the chloroform is evaporated off under reduced pressure. The dark brown oily residue is taken up in 20 parts by volume of methanol, warmed briefly with animal charcoal and filtered through aluminum oxide and "Hyflo." Methanolic hydrochloric acid is added to the so-obtained methanolic solution of N-butyl-6-methoxy-nortropine-benzilic acid ester until a pH of 3 is achieved whereupon the solution is concentrated down to a small volume. Upon addition of a small quantity of ether, the N-butyl-6-methoxy-nortropine-benzilic acid ester hydrochloride which, recrystallized from methanol-ether melts at 221–222°, crystallizes out.

*Example 28*

A mixture of 3.5 parts of N-butyl-6-methoxy-nortropine and 4.9 parts of benzoic acid-ethylester is heated with about 0.1 part of sodium metal at 125–130° under reduced pressure (12 mm. Hg) for 30 hours. After cooling, the reaction mixture is taken up in 40 parts by volume of 2-normal hydrochloric acid and is extracted with a total of 130 parts of volume of ether. 50 parts by volume of chloroform are then added to the aqueous hydrochloric acid solution, cooling is effected with ice, and aqueous ammonium hydroxide solution of 25% strength is added until alkalinity to phenolphthalein is achieved. Extraction is then carried out with a total of 270 parts by volume of chloroform, the combined chloroform extracts are dried over sodium sulfate, and the chloroform is evaporated off under slightly reduced pressure. The oily residue is taken up in 30 parts by volume of absolute methanol, and methanolic hydrochloric acid is used to convert the N-butyl-6-methoxy-nortropine-benzoic acid ester into the corresponding hydrochloride which, recrystallized from methanol-ether, melts at 221°.

*Example 29*

A mixture of 4 parts of N-butyl-6-methoxy-nortropine and 7.8 parts of veratric acid-ethylester is heated with about 0.1 part of sodium metal at 125–130° under reduced pressure (about 1 mm. Hg) for 30 hours. After cooling, the reaction mixture is taken up in 50 parts by volume of 2-normal hydrochloric acid and extracted with a total of 150 parts by volume of ether. Since the hydrochloride is very easily soluble in chloroform, it is extracted directly from the aqueous hydrochloric acid solution with a total of 300 parts by volume of chloroform. The so-obtained N-butyl-6-methoxy-nortropine-veratric acid ester hydrochloride melts at 198°, after recrystallization from methanol-ether.

*Example 30*

10 parts of N-butyl-6-ethoxy-nortropinone in 100 parts by volume of absolute methanol are hydrogenated in the presence of Raney nickel in an autoclave at 40–45° and 60 atmospheres pressure for 5 hours. After filtering off the catalyst and distilling off the solvent, the residue is distilled under high vacuum conditions, the desired N-butyl-6-ethoxy-nortropine distilling over at 100–108° at 0.005 mm. Hg.

A mixture of 8 parts of N-butyl-6-ethoxy-nortropine and 18 parts of benzilic acid ester is heated with about 0.1 part of sodium metal to 125–130° under a pressure of about 1 mm. Hg for 30 hours. After cooling, the reaction mixture is taken up in 50 parts by volume of 2-normal hydrochloric acid and extracted with a total of 110 parts by volume of ether. 50 parts by volume of chloroform are then added to the aqueous solution, cooling is carried out with ice, ammonium hydroxide solution of 25% strength is added until alkalinity is achieved, and extraction is carried out with a total of 280 parts by volume of chloroform. The combined chloroform extracts are dried over sodium sulfate, the extracting agent is evaporated off under reduced pressure, and the oily brown residue is purified with the aid of animal charcoal and aluminum oxide.

The N-butyl-6-ethoxy-nortropine-benzilic acid ester hydrochloride, recrystallized from ethanol-ether or acetone-ether, melts at 212–215°.

*Example 31*

A mixture of 5 parts of N-butyl-6-ethoxy-nortropine and 6.6 parts of benzoic acid-ethylester is heated with about 0.1 part of sodium metal to 125–130° under a pressure of about 1 mm. Hg for 30 hours. After cooling, the reaction mixture is taken up in 50 parts by volume of 2-normal hydrochloric acid and extracted with a total of 110 parts by volume of ether. 50 parts by volume of chloroform are then added to the aqueous solution, cooling is carried out with ice, ammonium hydroxide solution of 25% strength is added until alkalinity is achieved, and extracton is carried out with a total of 280 parts by volume of chloroform. The combined chloroform extracts are dried over sodium sulfate, the extracting agent is evaporated off under reduced pressure, and the oily brown residue is purified with the aid of animal charcoal and aluminum oxide.

The N-butyl-6-ethoxy-nortropine-benzoic acid ester hydrochloride, recrystallized from ethanol-ether, melts at 195–197°.

*Example 32*

5 parts of 6-isopropoxy-tropinone hydrochloride in 50 parts by volume of absolute ethanol are hydrogenated in the presence of Raney nickel in an autoclave at 40° and an initial pressure of 60 atmospheres for 5 hours. The catalyst is filtered off and the solvent is evaporated under reduced pressure, the residue is taken up in water and, after saturating the aqueous solution with potassium carbonate, it is extracted several times with chloroform. The chloroform solution is dried over sodium sulfate and is evaporated under reduced pressure, leaving as residue 6-isopropoxy-tropine which distils over as a colorless oil at 122–126° under a pressure of 0.75 mm. Hg.

A mixture of 2.6 parts of 6-isopropoxy-tropine and 6.7 parts of benzilic acid-ethylester is heated together with 0.1 part of sodium metal to 125–130° under reduced pressure (about 1 mm. Hg) for 30 hours. Upon completion of the reaction, the cooled reaction mixture is taken up in 40 parts by volume of 2-normal hydrochloric acid and is extracted with a total of 80 parts by volume of ether. 50 parts by volume of chloroform are added to the aqueous hydrochloric acid layer, aqueous ammonium hydroxide solution of 25% strength is added, while cooling with ice, until an alkaline reaction is achieved, and then extraction is carried out with a total of 250 parts by volume of chloroform. The combined chloroform extracts are dried over sodium sulfate, and, upon evaporation, leave an oily brown residue, which is taken up in a small quantity of methanol and is then filtered through animal charcoal and aluminium oxide. After evaporating the methanol under reduced pressure, there remains as an oily brown residue the 6-isopropoxy-tropine-benzilic acid ester, the hydrochloride of which has a melting point of 116–118°, after recrystallization from methanol-ether.

*Example 33*

A mixture of 5.9 parts of 6-methoxy-pseudo-tropine and 10.3 parts of benzoic acid-ethylester is heated together with about 0.2 part of sodium to 125–130° under reduced pressure (down to about 1 mm. Hg) for 30 hours. Upon completion of the reaction, the cooled reaction mixture is taken up in 50 parts by volume of 2-normal hydrochloric acid and shaken out with a total of 240 parts by volume of ether. The aqueous hydrochloric acid solution is extracted with a total of 300 parts by volume of chloroform, the combined chloroform extracts dried over sodium sulfate, and the solvent evaporated off under reduced pressure. The residue, 6-methoxy-pseudo-tropine-benzoic acid ester hydrochloride, is taken up in methanol, filtered through animal charcoal and, after recrystallization from methanol-ether, melts at 256–259°.

*Example 34*

A mixture of 5.4 parts of 6-methoxy-pseudotropine and 13.3 parts of veratric acid-ethylester is heated together with about 0.2 part of sodium to 130° under reduced pressure (down to about 1 mm. Hg) for 30 hours. Upon completion of the reaction, the cooled reaction mixture is taken up in 50 parts by volume of 2-normal hydrochloric acid and shaken out with a total of 240 parts by volume of ether. The aqueous hydrochloric acid solution is extracted with a total of 300 parts by volume of chloroform, the combined chloroform extracts dried over sodium sulfate, and the solvent evaporated off under reduced pressure. The residue, 6-methoxy-pseudo-tropine-veratric acid ester hydrochloride, is taken up in methanol, filtered through animal charcoal and, after recrystallization from methanol-ether, melts at 228–229°.

*Example 35*

16 parts of sodium are added portionwise, within the course of 2 hours and while stirring, to a boiling solution of 15 parts of N-butyl-6-methoxy-nortropinone in 150 parts by volume of absolute ethanol. The reaction mixture is distilled with steam, the residue extracted with a total of 500 parts by volume of ether, the extract dried over sodium sulfate, the ether evaporated off, and the residue fractionated in high vacuum. N-butyl-6-methoxy-pseudonortropine boils at 112–114° under a pressure of 0.25 mm. Hg.

A mixture of 1.7 parts of N-butyl-6-methoxy-pseudo-nortropine and 2.43 parts of benzoic acid-ethylester is heated under reflux to 125–130° under reduced pressure (as low as 1 mm. Hg) for 30 hours. Upon completion of the reaction, the cooled reaction mixture is taken up in 60 parts by volume of 2-normal hydrochloric acid and is shaken out with a total of 260 parts by volume of ether. The aqueous hydrochloric acid solution is extracted with a total of 400 parts by volume of chloroform, the combined chloroform extracts are dried over sodium sulfate and then the solvent is evaporated off under reduced pressure. The residue, N-butyl-6-methoxy-pseudo-nortropine-benzoic acid ester hydrochloride, is taken up in methanol, filtered through animal charcoal, and is crystallized from methanol-ether; the melting point is 259–261°.

*Example 36*

A mixture of 3.4 parts of N-butyl-6-methoxy-pseudo-nortropine and 6.8 parts of veratric acid-ethylester is heated together with about 0.2 part of sodium to 125–130° under reduced pressure (as low as 1 mm. Hg) for 30 hours. Upon completion of the reaction, the cooled reaction mixture is taken up in 50 parts by volume of 2-normal hydrochloric acid and then shaken out with a total of 230 parts by volume of ether. The aqueous hydrochloric acid solution is extracted with a total of 300 parts by volume of chloroform, and the combined chloroform extracts are dried over sodium sulfate and the solvent evaporated off under reduced pressure. The residue, N-butyl-6-methoxy-pseudo-nortropine-veratric acid ester hydrochloride, is taken up in methanol, filtered through animal charcoal, and recrystallized from methanol-ether. It is thus obtained in the form of needles which melt at 198–200°.

*Example 37*

A mixture of 4 parts of 6-methoxy-tropine and 2.59 parts of phthalic acid-ethylester is heated together with about 0.2 part of sodium to 125–130° under reduced pressure (as low as 1 mm. Hg) for 30 hours. Upon completion of the reaction, the cooled reaction mixture is taken up in 40 parts by volume of 2-normal hydrochloric acid and then shaken out with a total of 100 parts by volume of ether. The aqueous hydrochloric acid solution is extracted with a total of 300 parts by volume of chloroform, the combined chloroform extracts are dried over sodium sulfate, and the solvent is evaporated under reduced pressure. The oily residue is taken up in methanol, filtered through animal charcoal, and crystallized from methanol-ether. The 6-methoxy-tropine-phthalic acid-ethylester hydrochloride melts at 168–169°.

*Example 38*

A mixture of 5.1 parts of 6-ethoxy-pseudo-tropine and 14.1 parts of benzilic acid-ethylester is heated together with about 0.2 part of sodium to 110–115° under reduced pressure (as low as 1 mm. Hg) for 30 hours. Upon completion of the reaction, the cooled reaction mixture is taken up in 50 parts by volume of 2-normal hydrochloric acid and then shaken out with a total of 260 parts by volume of ether. The aqueous hydrochloric acid solution is extracted with a total of 260 parts by volume of chloroform, the combined chloroform extracts are dried over sodium sulfate, and the solvent is evaporated off under reduced pressure. The residue, 6-ethoxy-pseudo-tropine-benzilic acid ester hydrochloride, is taken up in ethanol, filtered through animal charcoal, concentrated, and caused to crystallize out by the addition of ether; melting point = 219–221° (with decomposition).

*Example 39*

28.4 parts of N-benzyl-6-ethoxy-nortropinone in 250 parts by volume of absolute ethanol are hydrogenated in the presence of Raney nickel in an autoclave at 40–45° and under an initial pressure of 60 atmospheres for 5 hours. The catalyst is then filtered off, the alcohol evaporated off under a slight vacuum, and the residue distilled under a high vacuum. The formed N-benzyl-6-ethoxy-nortropine boils at 128° at 0.06 mm. Hg.

A mixture of 6 parts of N-benzyl-6-ethoxy-nortropine and 11.8 parts of benzilic acid ethylester is heated together with about 0.2 part of sodium metal to 125–130° under reflux and under reduced pressure (about 1 mm. Hg) for 30 hours. After cooling, the reaction mixture is taken up in 50 parts by volume of 2-normal hydrochloric acid, and then extracted with a total of 130 parts by volume of ether. The aqueous hydrochloric acid layer is shaken out with a total of 300 parts by volume of chloroform, the chloroform extract dried over sodium sulfate and then evaporated under reduced pressure. The residue is dissolved in a small quantity of ethanol, filtered through animal charcoal, and the formed hydrochloride crystallized out of ethanol-ether. The N-benzyl-6-ethoxy-nortropine-benzilic acid ester hydrochloride, recrystallized from ethanol, is obtained as clusters of needles which melt at 211–212°.

Example 40

5 parts of N-benzyl-6-methoxy-nortropinone in 50 parts by volume of absolute methanol are hydrogenated in the presence of Raney nickel in an autoclave at 40–45° and at an initial pressure of 60 atmospheres for 5 hours. The catalyst is filtered off, and the solvent is evaporated under reduced pressure. The residue is fractionated under a high vacuum. The obtained N-benzyl-6-methoxy-nortropine is converted into the picrate which, after recrystallization from ethanol or acetone, melts at 190–192° (with decomposition).

A mixture of 12 parts of N-benzyl-6-methoxy-nortropine and 24.8 parts of benzilic acid-ethylester is heated under reflux together with about 0.3 part of sodium metal at a temperature of 120–130° under reduced pressure for 30 hours. The reaction mixture, after cooling thereof, is taken up in 60 parts by volume of 2-normal hydrochloric acid, and is then extracted with a total of 330 parts by volume of ether. The aqueous hydrochloric acid layer is shaken out with a total of 390 parts by volume of chloroform, the chloroform extract is dried and then evaporated under reduced pressure. The residue is dissolved in a small quantity of methanol, boiled for a short time with animal charcoal, and then filtered through "Hyflo." The filtrate is concentrated and, after the addition thereto of ether, N-benzyl-6-methoxy-nortropine-benzilic acid ester hydrochloride, which decomposes at 238–240°, separates out.

Example 41

A mixture of 8 parts of N-benzyl-6-methoxy-nortropine and 10.3 parts of benzoic acid-ethylester is heated under reflux together with about 0.2 part of sodium metal to 120–130° under reduced pressure (about 1 mm. Hg.) for 30 hours. The reaction mixture is, after cooling thereof, taken up in 50 parts by volume of 2-normal hydrochloric acid, and is then extracted with a total of 170 parts by volume of ether. The aqueous hydrochloric acid layer is shaken out with a total of 340 parts by volume of chloroform, the chloroform extract is dried and then evaporated under reduced pressure. The residue is dissolved in a small quantity of methanol, boiled for a short time with animal charcoal, and filtered through "Hyflo." The filtrate is concentrated and, after the addition of ether, N-benzyl-6-methoxy-nortropine-benzoic acid ester hydrochloride, which decomposes at 200–202°, separates out.

Example 42

15 parts of sodium are added portionwise in the course of 2 hours and with stirring to a boiling solution of 15 parts of N-benzyl-6-methoxy-nortropinone in 170 parts by volume of absolute ethanol. The reaction mixture is distilled with steam, the residue extracted with a total of 300 parts by volume of ether, the ether evaporated off after drying over sodium sulfate, and the residue fractionated in a high vacuum. The desired N-benzyl-6-methoxy-norpseudotropine boils at 149–151° under a pressure of 0.06 mm. Hg.

A mixture of 5 parts of N-benzyl-6-methoxy-norpseudotropine and 6.4 parts of benzoic acid-ethylester is heated under reflux together with about 0.2 part of sodium metal to 120–130° in vacuo (about 1 mm. Hg) for 30 hours. The reaction mixture, after being cooled, is taken up in 60 parts by volume of 2-normal hydrochloric acid and is then extracted with a total of 230 parts by volume of ether. The aqueous hydrochloric acid layer is shaken out with a total of 300 parts by volume of chloroform, after which the chloroform extract is dried and evaporated under reduced pressure. The residue is dissolved in a small quantity of methanol, boiled for a short time with animal charcoal, and filtered through "Hyflo." The filtrate is then concentrated and, after the addition of ether thereto, N-benzyl-6-methoxy-norpseudotropine-benzoic acid ester hydrochloride which decomposes at 250–252°, crystallizes out.

The "Hyflo" used in some of the foregoing examples is purified fuller's earth.

In addition to the salts mentioned in the preceding examples, the free compounds of the present invention also form salts with many other inorganic and organic acids. In view of the pharmaceutical utility of said salts, the invention comprises only those salts which are physiologically tolerable and compatible, as for example the salts of hydrochloric, hydrobromic and tartaric acid.

Having thus disclosed the invention, what is claimed is:

1. A compound selected from the group consisting of 6-alkoxy-tropine derivatives which correspond to the formula

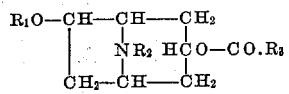

and the salts thereof with acids, wherein $R_1$ stands for lower alkyl, $R_2$ is a member selected from the group consisting of lower alkyl, lower alkenyl, lower hydroxyalkyl and benzyl, and $R_3$ is a member selected from the group consisting of

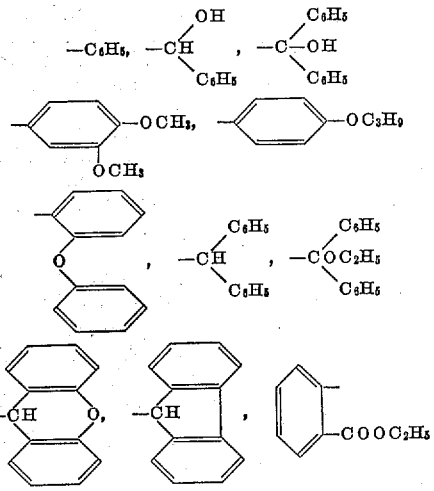

2. 6-methoxytropine-benzilic acid ester.
3. 6-methoxy-pseudo-tropine-benzilic acid ester.
4. 6-ethoxy-pseudo-tropine-benzilic acid ester.
5. 6 - methoxy - pseudo - tropine - xanthene - 9 - carboxylic acid ester.
6. 6 - ethoxy - pseudo - tropine - xanthene - 9 - carboxylic acid ester.

References Cited in the file of this patent

Rothlin et al.: Experientia, vol. 10, pp. 142–5 (1954).

UNITED STATES PATENT OFFICE

CERTIFICATE OF CORRECTION

Patent No. 2,800,476 July 23, 1957

Arthur Stoll et al.

It is hereby certified that error appears in the printed specification of the above numbered patent requiring correction and that the said Letters Patent should read as corrected below.

Column 2, line 67, before "reaction" insert -- the --; column 6, line 29, for "torpinone" read -- tropinone --; column 7, line 31, for "chlorofrom" read -- chloroform --; column 12, line 38, for "extracton" read -- extraction --; column 14, line 44, for "residuce" read -- residue --; column 16, line 40, for the extreme right-hand portion of the formula reading "$-OC_3H_9$" read -- $-OC_4H_9$ --.

Signed and sealed this 8th day of October 1957.

(SEAL)
Attest:

KARL H. AXLINE
Attesting Officer

ROBERT C. WATSON
Commissioner of Patents